(12) United States Patent  (10) Patent No.: US 8,814,336 B2
Jones et al.  (45) Date of Patent: Aug. 26, 2014

(54) SOLID INK STICK CONFIGURATION

(75) Inventors: Brent R. Jones, Sherwood, OR (US); Frederick T. Mattern, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 196 days.

(21) Appl. No.: 13/334,569

(22) Filed: Dec. 22, 2011

(65) Prior Publication Data

US 2013/0162739 A1  Jun. 27, 2013

(51) Int. Cl.
    *B41J 2/01*  (2006.01)

(52) U.S. Cl.
    USPC .............................. 347/99; 347/88

(58) Field of Classification Search
    USPC ..................................... 347/88, 99
    See application file for complete search history.

(56) References Cited

U.S. PATENT DOCUMENTS

| | | |
|---|---|---|
| 3,722,240 A | 3/1973 | Spain et al. |
| 4,636,803 A | 1/1987 | Mikalsen |
| 4,723,135 A | 2/1988 | Yano et al. |
| 4,889,560 A | 12/1989 | Jaeger et al. |
| 5,023,388 A | 6/1991 | Luker |
| 5,135,165 A | 8/1992 | Greenhow |
| 5,181,049 A | 1/1993 | Mackay et al. |
| 5,223,860 A | 6/1993 | Loofbourow et al. |
| 5,442,387 A | 8/1995 | Loofbourow et al. |
| 5,734,402 A | 3/1998 | Rousseau et al. |
| 5,861,903 A | 1/1999 | Crawford et al. |
| 5,908,950 A | 6/1999 | Cooke et al. |
| 5,975,688 A | 11/1999 | Kanaya et al. |
| 5,975,690 A | 11/1999 | Grellmann et al. |
| 6,053,608 A | 4/2000 | Ishii et al. |
| 6,213,600 B1 | 4/2001 | Kobayashi et al. |
| 6,353,479 B1 | 3/2002 | Lubawy et al. |
| 6,422,694 B1 | 7/2002 | Hollands |
| 6,543,867 B1 | 4/2003 | Jones |
| 6,572,225 B1 | 6/2003 | Jones |
| 6,672,716 B2 | 1/2004 | Jones |
| 6,719,419 B2 | 4/2004 | Jones et al. |
| 6,722,764 B2 | 4/2004 | Jones et al. |
| 6,739,713 B2 | 5/2004 | Jones et al. |
| 6,761,443 B2 | 7/2004 | Jones |
| 6,840,612 B2 | 1/2005 | Jones et al. |
| 6,986,570 B2 | 1/2006 | Jones et al. |
| 7,063,412 B2 | 6/2006 | Jones et al. |
| 7,163,273 B2 | 1/2007 | Silverbrook |
| 7,537,326 B2 | 5/2009 | Jones |
| 2003/0038851 A1 | 2/2003 | Oriol |
| 2003/0202056 A1 | 10/2003 | Jones et al. |
| 2003/0202064 A1 | 10/2003 | Jones et al. |
| 2003/0202067 A1 | 10/2003 | Jones et al. |

(Continued)

OTHER PUBLICATIONS

Search Report of the Intellectual Property Office corresponding to Great Britain Patent Application No. GB1221792.3; Intellectual Property Office, Newport, South Wales; Mar. 27, 2013; 3 pages.

(Continued)

*Primary Examiner* — Laura Martin

(74) *Attorney, Agent, or Firm* — Maginot, Moore & Beck, LLP

(57) ABSTRACT

A solid ink stick configuration efficiently provides functional features for use of the ink stick in a phase change ink printer without adversely impacting the volumetric content of the ink stick and its appearance.

7 Claims, 2 Drawing Sheets

(56) References Cited

U.S. PATENT DOCUMENTS

| | | |
|---|---|---|
| 2003/0202074 A1 | 10/2003 | Jones |
| 2003/0202077 A1 | 10/2003 | Jones et al. |
| 2003/0202078 A1 | 10/2003 | Jones et al. |
| 2005/0088499 A1 | 4/2005 | Jones et al. |
| 2006/0279617 A1 | 12/2006 | Korn et al. |
| 2007/0296779 A1* | 12/2007 | Tidrick .......................... 347/88 |
| 2008/0012916 A1 | 1/2008 | Jones |
| 2008/0088688 A1 | 4/2008 | Jones et al. |
| 2008/0117265 A1 | 5/2008 | Esplin et al. |
| 2008/0218548 A1 | 9/2008 | Fairchild et al. |
| 2008/0218572 A1* | 9/2008 | Fairchild et al. ................ 347/99 |
| 2010/0013898 A1 | 1/2010 | Jones et al. |
| 2012/0092425 A1 | 4/2012 | Mattern et al. |

OTHER PUBLICATIONS

Pin tumbler lock, Jun. 28, 2011, 2 pages, Wikipedia.org, Wikimedia Foundation, Inc., USA.

Office Action from the Canadian Intellectual Property Office corresponding to Canadian Application No. 2,798,936; Canadian Intellectual Property Office, Gatineau, Quebec, Canada; Feb. 19, 2014; (2 pages).

* cited by examiner

SOLID INK STICK CONFIGURATION

TECHNICAL FIELD

The solid ink stick delivery system disclosed below are used in phase change ink printers, and, more particularly, in phase change ink printers that have delivery systems configured for solid ink that is larger than pellets or pastilles.

BACKGROUND

Solid ink or phase change ink printers conventionally receive ink in various solid forms, such as pellets or ink sticks. The solid ink pellets or ink sticks are typically inserted through an insertion opening of an ink loader for the printer, and the ink sticks are moved along a feed channel by a feed mechanism and/or gravity toward a melting device. The melting device heats the solid ink impinging on the device until it melts. The liquid ink is collected and delivered to a printhead for jetting onto a recording medium.

Known ink sticks are variously configured with predetermined protuberances and indentations that serve a number of purposes. Some previously known solid ink stick configurations included protuberances and indentations that restrict the insertion of solid ink sticks into particular feed channel openings. In other configurations, some of the protuberances and indentations are used to guide the ink stick through a feed channel, to limit the interaction of the ink stick with feed channel structures, to interact with identification sensors within the ink loading device, or to activate sensors positioned along the feed channel to provide information regarding the position of the ink stick in a feed channel. Other protuberances and indentations provide humanly perceptible indicia that help a user identify an ink stick color or help a user correlate an ink stick with a particular printer or feed channel in a printer. In each ink stick configuration, a balance is required between ink stick esthetics, unique identification and intended usage purposes for different printer configurations and ink formulations, and the need to provide a customer with a reasonable volume of ink that will withstand manual handling and maneuvering along a feed channel to a melting device. Each configuration requires thorough and careful engineering.

SUMMARY

A solid ink stick configuration efficiently provides functional features for use of the ink stick in a phase change ink printer without adversely impacting the volumetric content of the ink stick and its appearance, which conveys a sense of purposeful function contributing to perceived value, makes handling and loading of the ink stick intuitive, and imparts visually recognizable differences among a multitude of shapes, which are simultaneously existent in the market. The solid ink stick includes a solid ink body having a center, a first end surface, a second end surface, the first end surface and the second end surface being configured on the solid ink body to enable an axis to extend from the first end surface to the second end surface and pass through the center of the solid ink body without passing through any other surface of the solid ink body, a third surface that extends from an edge of the first end surface to an edge of the second end surface, a first pair of protuberances extending from the third surface at a first height, a first protuberance in the first pair of protuberances being positioned at a distance from the second end surface that is different than a distance from the second end surface at which the other protuberance in the first pair of protuberances is positioned, a second pair of protuberances extending from the third surface at the first height, a first protuberance in the second pair of protuberances being positioned at a distance from the second end surface that is different than a distance from the second end surface at which the other protuberance in the second pair of protuberances is positioned and each of the protuberances in the second pair of protuberances being positioned at a distance from the second end surface that is greater than either distance from the second end surface at which the protuberances of the first pair of protuberances are positioned, and a fifth protuberance extending from the third surface, the fifth protuberance being positioned at a distance from the second end surface that is different than each distance at which each protuberance in at least the first pair of protuberances is positioned from the second end surface and a volume of the fifth protuberance is greater than any protuberance in either the first pair of protuberances or the second pair of protuberances.

BRIEF DESCRIPTION OF THE DRAWINGS

The solid ink stick structure configured for use in a phase change ink printer is discussed with reference to the drawings now described.

DETAILED DESCRIPTION

The term "printer" refers, for example, to devices that produce images on media, such as printers, facsimile machines, copiers, and related multi-function products. Solid ink may be called or referred to in this document as ink, ink sticks, or sticks.

Figure 1:
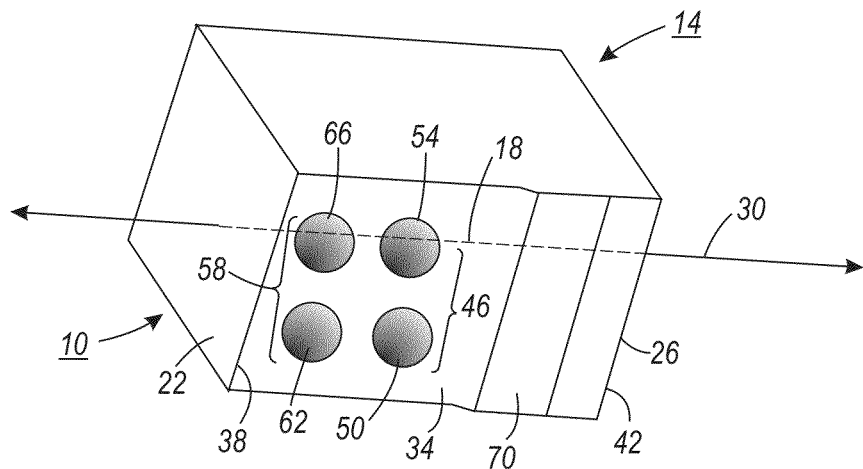
FIG. 1 is a bottom view of a solid ink stick having two pairs of protuberances to provide a first function while a fifth protuberance provides a support function.

FIG. 1 shows an example of a solid ink stick 10 having a configuration with features that emphasize visual differentiation between a multitude of earlier generation ink sticks, current printer model marketing and geographic considerations, and that enables future ink sticks to pose similar or equivalent interfaces and/or exclusionary features along with differentiating features. This configuration enables applicable usage of the ink stick to be determined by a user prior to insertion into the ink handling device of an imaging product. The solid ink stick 10 has a body 14 with a center 18, a first end surface 22, and a second end surface 26. The center, as used in this document, refers to the center of gravity for the body as that term is defined in physics. The first end surface 22 and the second end surface 26 are oriented and positioned on the solid ink body 14 to enable an axis 30 to extend from the first end surface 22 to the second end surface 26 and pass through the center 18 of the solid ink body 14 without passing through any other surface of the solid ink body 14. A third surface 34 extends from an edge 38 of the first end surface 22 to an edge 42 of the second end surface 26. A first pair of protuberances 46 extends from the third surface 34 at a first height. The protuberance 50 in the first pair of protuberances 46 is positioned at a distance D1 from the second end surface 26 that is different than a distance D2 from the second end surface 26 at which the other protuberance 54 in the first pair of protuberances 46 is positioned. A second pair of protuberances 58 extends from the third surface 34 at the first height. The protuberance 62 in the second pair of protuberances is positioned at a distance D3 from the second end surface 26 that is different than a distance D4 from the second end surface 26 at which the other protuberance 66 in the second pair of protuberances 58 is positioned. Also, as shown in FIG. 1, each of the protuberances 62, 66 in the second pair of protuberances 58 is positioned at a distance D3, D4, respectively, from the second end surface that is greater than either distance D1, D2 from the second end surface at which the protuberances 50, 54 of the first pair of protuberances 46 are positioned. A fifth protuberance 70 extends from the third surface 34. The fifth protuberance 70 is positioned at a distance D5 from the second end surface 26 that is different than each distance D1, D2 at which each protuberance 50, 54 in at least the first pair of protuberances 46 is positioned from the second end surface 26 and a volume of the fifth protuberance 70 is greater than any protuberance 50, 54, 62, 66 in either the first pair of protuberances 46 or the second pair of protuberances 58.

As used in this document, "a pair of protuberances" refers to a set or group of protuberances that have at least two protuberances, but can have more than two protuberances provided the other structural limitations of a pair of protuberances as defined by the claims in this document are met. "Protuberances" refer to the common meaning of "thrusting out from a surrounding or adjacent surface."

In one embodiment, the protuberance 70 operates as a rest that supports the weight of the solid ink stick 10 on a feed channel guide feature. In another embodiment, the protuberance 70 operates as a rest that supports the weight of the solid ink stick 10 on a drive member. In both of those embodiments, the distances from the second end 26 of the ink stick body 14 of the protuberances place the protuberances at angle with respect to one another that correspond to an angle on a lead screw that is operated as a drive member to move the ink stick through a feed channel.

In another embodiment, each protuberance 50, 54 of the first pair of protuberances 46 and the second pair of protuberances 58 has a volume approximately equal to a volume of the other protuberances in the first pair of protuberances and the second pair of protuberances. As shown in the embodiment of FIG. 1, each protuberance 50, 54 of the first pair of protuberances 46 and the second pair of protuberances 46 has a curved surface, although other linear and non-linear profiles can be used.

Other embodiments of the ink stick have a fifth protuberance 70 with other characteristics. For example, in one embodiment, the volume of the fifth protuberance 70 is at least thirty percent greater than any protuberance in either the first pair of protuberances 46 or the second pair of protuberances 58. In another embodiment, the fifth protuberance 70 extends across a width of the third surface 34 that is orthogonal to a line extending from the first end surface 22 to the second end surface 26 and also extends parallel to the axis 30 that extends from the first end surface 22 to the second end surface 26 that passes through the center 18 of the solid ink body 14. In other embodiments, the fifth protuberance does not completely cover the width of the third surface, but is truncated on one or both ends of the protuberance in the direction that parallels the width of the third surface 34. In yet another embodiment, the shape and/or size, including the height, of the protuberance second pair 58 can be different than the first pair 46 or such differences can apply to individuals within the pair. In any of these embodiments, the ink stick is configured in such a manner as to accomplish the intended rest, guidance, or feed function. These various configurations enhance the range of visual differentiation between individual sticks apart from the interface functions of the ink stick with the ink handling/loading device of a printer.

Figure 2:
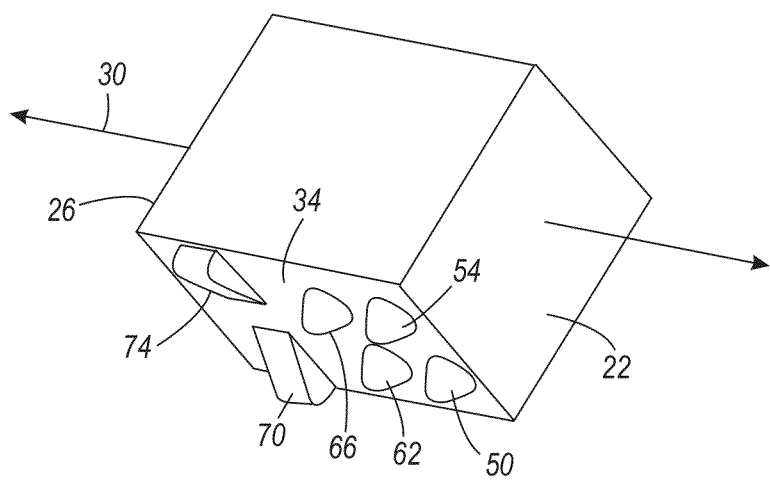
FIG. 2 is a bottom view of another embodiment of the solid ink stick shown in FIG. 1.

In FIG. 2, another embodiment of the solid ink stick is shown with like features being identified with the same reference numbers used to identify features in the embodiment of FIG. 1. In this embodiment, the fifth protuberance is not a unitary structure, but rather divided into a fifth protuberance 70 and a sixth protuberance 74. The sixth protuberance 74 extends from the third surface 34 and a sum of the volume of the fifth protuberance and a volume of the sixth protuberance is greater than any protuberance 50, 54, 62, 66 in either the first pair of protuberances 46 or the second pair of protuberances 58. In this embodiment, the fifth protuberance 70 and the sixth protuberance 74 each have a surface 78 that slopes relative to a plane of the third surface 34 from a first height, which is not inset in the third surface, to a second height above the third surface. In one embodiment, the second height is greater than the first height, while in another embodiment, the second height is equal to the first height.

Figure 3:
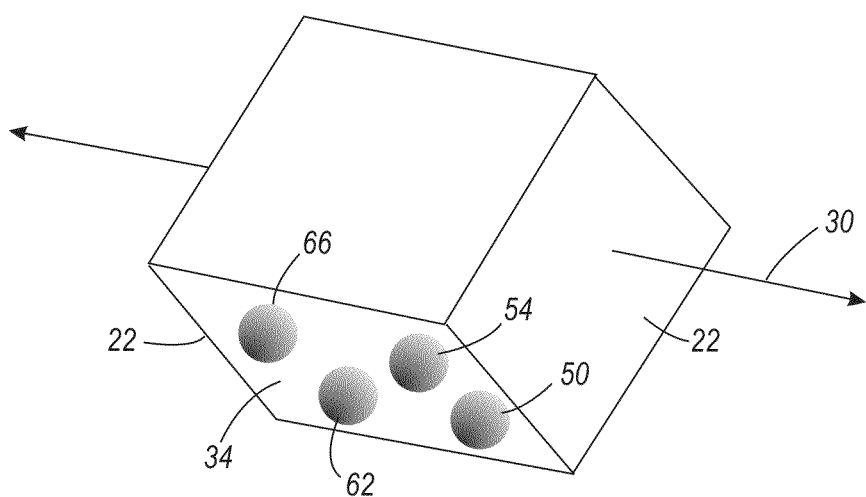
FIG. 3 is a bottom view of another embodiment of the solid ink stick shown in FIG. 1 with the third surface providing the support function that the fifth protuberance provided in the embodiment of FIG. 1.
Figure 4:
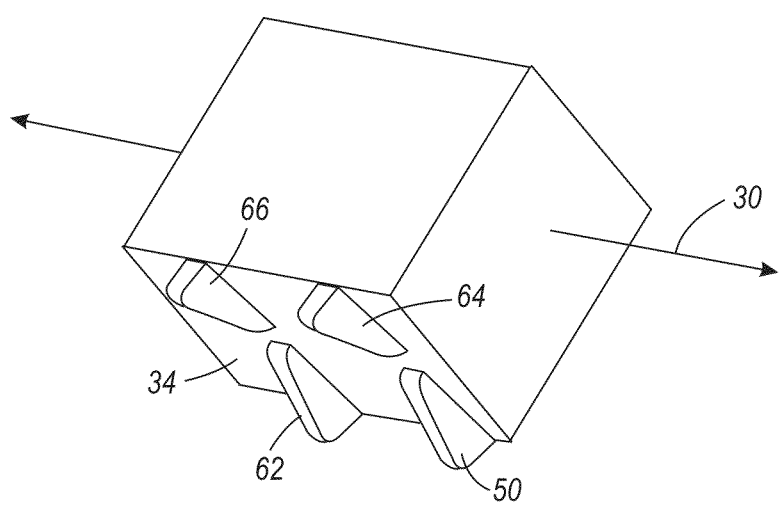
FIG. 4 is a bottom view of another embodiment of the solid ink stick shown in FIG. 1 with the third surface providing the support function that the fifth protuberance provided in the embodiment of FIG. 1 and with a different shape in the protuberances of the two pairs of protuberances shown in FIG. 1 and FIG. 3.

In FIG. 3, another embodiment of the solid ink stick is shown with like features being identified with the same reference numbers used to identify features in the embodiment of FIG. 1. In this embodiment, the fifth protuberance has been removed and the third surface 34 provides support for the solid ink stick. The spacing between the first pair of protuberances and the second pair of protuberances is greater than shown in FIG. 1. A similar embodiment not having a fifth protuberance is shown in FIG. 4. As noted above, some embodiments have protuberances have linear shapes, as shown in FIG. 4, while other embodiments have linear shapes as shown in FIG. 3.

Those skilled in the art will recognize that numerous modifications can be made to the specific implementations described above. For example, the size and number of rest features and the position and relative spacing of all protuberances as well as size and shape of the individual protuberance elements can vary based on both functional and visual differentiation objectives. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A solid ink stick comprising:
a solid ink body having a center;
a first end surface;
a second end surface, the first end surface and the second end surface being configured on the solid ink body to enable an axis to extend from the first end surface to the second end surface and pass through the center of the solid ink body without passing through any other surface of the solid ink body;
a third surface that extends from an edge of the first end surface to an edge of the second end surface;

a first pair of protuberances extending from the third surface, a first protuberance in the first pair of protuberances being positioned at a distance from the second end surface that is different than a distance from the second end surface at which the other protuberance in the first pair of protuberances is positioned, the first protuberance and the second protuberance of the first pair of protuberances being positioned on different sides of the axis extending from the first end surface to the second end surface;

a second pair of protuberances extending from the third surface, a first protuberance in the second pair of protuberances being positioned at a distance from the second end surface that is different than a distance from the second end surface at which the other protuberance in the second pair of protuberances is positioned and each of the protuberances in the second pair of protuberances being positioned at a distance from the second end surface that is greater than either distance from the second end surface at which the protuberances of the first pair of protuberances are positioned, the first protuberance and the second protuberance of the second pair of protuberances being positioned on different sides of the axis extending from the first end surface to the second end surface;

a fifth protuberance extending from the third surface, the fifth protuberance being positioned at a distance from the second end surface that is greater than each distance at which each protuberance in at least the first pair of protuberances is positioned from the second end surface and a volume of the fifth protuberance is greater than any protuberance in either the first pair of protuberances or the second pair of protuberances; and a sixth protuberance extending from the third surface and a sum of the volume of the fifth protuberance and a volume of the sixth protuberance is greater than any protuberance in either the first pair of protuberances or the second pair of protuberances, the fifth protuberance and the sixth protuberance being positioned on different sides of the axis extending from the first end surface to the second end surface, and the fifth protuberance and the sixth protuberance each have a surface that slopes relative to a plane of the third surface from a first height not inset from the third surface to a second height, the second height being greater than the first height.

2. The solid ink stick of claim 1 wherein the protuberances of the first pair of protuberances and the protuberances of the second pair of protuberances are identical in size and shape.

3. The solid ink stick of claim 1 wherein each protuberance of the first pair of protuberances and the second pair of protuberances has a volume approximately equal to a volume of the other protuberances in the first pair of protuberances and the second pair of protuberances.

4. The solid ink stick of claim 1 wherein each protuberance of the first pair of protuberances and the second pair of protuberances has a curved surface.

5. The solid ink stick of claim 1 wherein a first protuberance of the first pair of protuberances and a first protuberance of the second pair of protuberances are separated from the other protuberances in the first pair of protuberances and the second pair of protuberances by an equal distance.

6. The solid ink stick of claim 1 wherein the volume of the fifth protuberance is at least thirty percent greater than any protuberance in either the first pair of protuberances or the second pair of protuberances.

7. The solid ink stick of claim 1 wherein the fifth protuberance extends across a width of the third surface that is orthogonal to a line extending from the first end surface to the second end surface and also extends parallel to the axis extending from the first end surface to the second end surface that passes through the center of the solid ink body.

* * * * *